(12) United States Patent
Rivera et al.

(10) Patent No.: US 11,029,808 B2
(45) Date of Patent: Jun. 8, 2021

(54) SYSTEMS AND METHODS FOR GENERATING A DYNAMICALLY ADJUSTABLE DIAL PAD

(71) Applicant: PAG Financial International LLC, Guaynabo, PR (US)

(72) Inventors: Jonathan Ortiz Rivera, Cerritos, CA (US); Gabriel Albors Sanchez, Cerritos, CA (US); Pavan Agarwal, Cerritos, CA (US)

(73) Assignee: PAG Financial International LLC, Guaynabo, PR (US)

( * ) Notice: Subject to any disclaimer, the term of this patent is extended or adjusted under 35 U.S.C. 154(b) by 125 days.

(21) Appl. No.: 15/909,928

(22) Filed: Mar. 1, 2018

(65) Prior Publication Data
US 2019/0272081 A1  Sep. 5, 2019

(51) Int. Cl.
| | | |
|---|---|---|
| *G06F 3/0481* | (2013.01) | |
| *H04L 29/08* | (2006.01) | |
| *H04M 1/72403* | (2021.01) | |
| *H04M 1/72469* | (2021.01) | |

(52) U.S. Cl.
CPC .......... *G06F 3/04817* (2013.01); *H04L 67/22* (2013.01); *H04M 1/72403* (2021.01); *H04M 1/72469* (2021.01)

(58) Field of Classification Search
CPC .............. G06F 3/04817; H04L 67/22; H04M 1/72469; H04M 1/72403
See application file for complete search history.

(56) References Cited

U.S. PATENT DOCUMENTS

| | | | | |
|---|---|---|---|---|
| 9,454,354 | B2* | 9/2016 | Kumar | G06F 3/0488 |
| 2005/0251824 | A1* | 11/2005 | Thomas | G06Q 30/02 |
| | | | | 725/42 |
| 2009/0158155 | A1 | 6/2009 | Quinn et al. | |

(Continued)

OTHER PUBLICATIONS

International Search Report and Written Opinion in PCT/US2019/017130, dated Apr. 23, 2019.
(Continued)

*Primary Examiner* — Beau D Spratt
(74) *Attorney, Agent, or Firm* — Sheppard Mullin Richter Hampton LLP

(57) ABSTRACT

Systems and methods for estimating relevant functionalities are disclosed. Example embodiments include a system for estimating relevant functionalities. The system may include a receiver adapted to receive incoming signals and a transmitter adapted to send outgoing signals. Additionally, the system may include circuitry coupled to the transmitter and receiver. The system may cause the circuitry to use the receiver to obtain information gathered from one or more applications supported by the electronic device. The system may cause the circuitry to remove a subset of personally identifying information from the information obtained. The system may determine an estimated user preference for a functionality of a set of functionalities using the information obtained. The functionality may correspond to an icon in an array of icons presentable on a display of the electronic device. The system may use the transmitter to communicate the estimated user preference for the functionality to the electronic device.

20 Claims, 8 Drawing Sheets

(56) References Cited

U.S. PATENT DOCUMENTS

| | | | | |
|---|---|---|---|---|
| 2010/0016011 | A1* | 1/2010 | Alen | G06Q 30/02 |
| | | | | 455/550.1 |
| 2010/0250243 | A1* | 9/2010 | Schalk | G10L 15/22 |
| | | | | 704/201 |
| 2011/0028138 | A1 | 2/2011 | Davies-Moore et al. | |
| 2011/0191856 | A1* | 8/2011 | Keen | G06F 21/32 |
| | | | | 726/26 |
| 2012/0124519 | A1* | 5/2012 | Uphoff | G06F 16/148 |
| | | | | 715/811 |
| 2013/0086481 | A1* | 4/2013 | Balasaygun | G06F 3/0484 |
| | | | | 715/745 |
| 2014/0074800 | A1 | 3/2014 | Gventer et al. | |
| 2014/0101600 | A1* | 4/2014 | Macbeth | G06Q 30/0282 |
| | | | | 715/780 |
| 2014/0282245 | A1* | 9/2014 | Scarborough | G06F 3/04842 |
| | | | | 715/811 |
| 2014/0298293 | A1* | 10/2014 | Nishio | G06F 8/30 |
| | | | | 717/121 |
| 2016/0063612 | A1* | 3/2016 | Lopez | H04M 3/42178 |
| | | | | 455/414.1 |
| 2016/0224211 | A1* | 8/2016 | Xu | H04M 1/72586 |
| 2016/0342314 | A1 | 11/2016 | Dickerson | |
| 2017/0053240 | A1 | 2/2017 | Woolford | |
| 2017/0149795 | A1* | 5/2017 | Day, II | H04W 4/02 |
| 2017/0300588 | A1 | 10/2017 | Johnson | |
| 2018/0124105 | A1* | 5/2018 | Rodrigues | H04L 63/1425 |
| 2018/0217728 | A1* | 8/2018 | Liu | H04M 1/724 |

OTHER PUBLICATIONS

International Preliminary Report on Patentability in PCT/US2019/017130, dated Apr. 24, 2020.

* cited by examiner

SYSTEMS AND METHODS FOR GENERATING A DYNAMICALLY ADJUSTABLE DIAL PAD

BACKGROUND

Phones, such as smart phones, use a static image for a dial pad. Most such dial pads have only twelve keys, including the star and pound key. Such dial pads do not use information gathered by the phone to dynamically adjust what is presented to a user on the dial pad. Thus, some systems that provide dial pads are limited because they present a dial pad that does not change. By way of example, such dial pads do not account for a user's preferences and/or activity history.

SUMMARY

The disclosed technology relates generally to smart dial pads, and more particularly, several embodiments relate to systems and methods for generating a dynamically adjustable dial pad.

In view of the above-described example shortcomings in certain systems, there is a need for a system that provides a dynamically adjustable dial pad, including in some examples, by generating a smart dial pad on an electronic device that may provide functionalities based on user preferences. In particular, there is a need for such systems that take into consideration various factors corresponding to a user's preferences and estimate what functionalities a user may deploy next. Information may be gathered by the electronic device, such as browsing history, location information, time information, audio information, etc. The information may be used to estimate a value a functionality has for a user. The value may be used in ranking information for a functionality. Embodiments of the present disclosure include systems, methods, and devices capable of generating a dynamically adjustable dial pad, as well as interconnected processors and/or circuitry, to generate a modified array of icons using ranking information for a set of functionalities. In some examples, the functionalities that are estimated to be relevant to a user are presented by and selectable using the modified array of icons.

In accordance with aspects of the present disclosure, an electronic device generates a dynamically adjustable dial pad. The electronic device includes a display adapted to present an array of icons. The array of icons is responsive to user input received via the display. The electronic device further includes a transceiver adapted to send and receive communication signals via one or more communication media. The electronic device also includes circuitry adapted to gather information from one or more applications supported by the electronic device. The circuitry is coupled to the display, the transceiver, and a non-transitory computer-readable medium. The non-transitory computer-readable medium stores instructions that, when executed, causes the circuitry to perform a number of operations.

One such operation is to present the array of icons using the display. Another such operation is to gather information from the one or more applications supported by the electronic device. Yet another such operation is to use the transceiver to send the information gathered from the one or more applications to a remote server. Another such operation is to use the transceiver to receive, from the remote server, ranking information for a set of functionalities that are executable by the one or more applications. The ranking information is determined at the remote server using the information gathered from the one or more applications. For each of the functionalities in the set, the ranking information represents an estimated relevance to a user. Yet another such operation includes the circuitry of the electronic device generating a modified array of icons using the ranking information for the set of functionalities. Another such operation includes the display of the electronic device presenting the modified array of icons. At least one of the functionalities that is estimated to be relevant to a user is selectable using the modified array of icons via the display.

In embodiments, the non-transitory computer-readable medium further stores instructions that, when executed, cause the circuitry to obtain time information from a time component of the electronic device. The modified array of icons uses the time information.

In embodiments, the non-transitory computer-readable medium further stores instructions that, when executed, cause the circuitry to obtain audio information from an audio component of the electronic device. The modified array of icons uses the audio information.

In embodiments, the non-transitory computer-readable medium further stores instructions that, when executed, cause the circuitry obtain optical information from an optical component of the electronic device. The modified array of icons uses the optical information.

In embodiments, the non-transitory computer-readable medium further stores instructions that, when executed, cause the circuitry to perform a number of additional and/or alternative operations. One such operation is to determine that input received via a graphical user interface of the display matches a shortcut stored in the remote server. The shortcut corresponds to at least one of the functionalities. Another such operation is to generate an option for interacting with the at least one functionality corresponding to the shortcut. Yet another such operation is to cause the display to provide the option for interacting with the at least one functionality.

In embodiments, the information gathered by the circuitry includes advertisement content information and user input received in response to advertisement content.

In accordance with additional aspects of the present disclosure, a computer-implemented method for generating a dynamically adjustable dial pad includes a number of operations. The method includes a display of an electronic device presenting an array of icons that are responsive to user input received via the display. The method further includes circuitry of the electronic device gathering information from one or more applications supported by the electronic device. The method further includes a transceiver of the electronic device sending the information gathered from the one or more applications to a remote server. The method further includes the transceiver of the electronic device receiving, from the remote server, ranking information for a set of functionalities that are executable by the one or more applications. The ranking information is determined at the remote server using the information gathered from the one or more applications supported by the electronic device. For each of the functionalities in the set, the ranking information represents an estimated relevance to a user. The method further includes the circuitry of the electronic device generating a modified array of icons using the ranking information. Additionally, the method includes the display of the electronic device presenting the modified array of icons. At least one of the functionalities that is estimated to be relevant to a user is selectable using the modified array of icons via the display.

In embodiments, the method further includes, responsive to input received via a selected icon of the modified array of icons, providing an option for interacting with the selected icon.

In embodiments, the ranking information includes a value for each of the functionalities of the set of functionalities. The value for a given functionality of the set of functionalities corresponds to the estimated relevance of the given functionality.

In embodiments, the method further includes the circuitry of the electronic device applying a tag to the information gathered from the one or more applications. The tag corresponds to one of the functionalities.

In embodiments, the method further includes the circuitry of the electronic device encrypting the information gathered from the one or more applications. The encrypting is done before the transceiver sends the information gathered from the one or more applications to the remote server.

In embodiments, the method further includes the circuitry of the electronic device obtaining location information from a location component of the electronic device. The circuitry of the electronic device generating the modified array of icons further includes using the location information.

In embodiments, the method further includes the circuitry of the electronic device obtaining extracted text from the one or more applications supported by the electronic device. The circuitry of the electronic device generating the modified array of icons further includes using the extracted text.

Additional aspects of the present disclosure may disclose an electronic device couplable to a server. The electronic device includes memory operatively coupled to logic circuitry. The memory stores instructions that, when executed, cause the logic circuitry to perform a number of operations.

One such operation is to present an array of icons that are responsive to user input using the display. Another such operation is to gather information from one or more applications supported by the electronic device. Yet another such operation is to communicate the information gathered from the one or more applications to a remote server. Another such operation is to obtain, from the remote server, ranking information for a set of functionalities that are executable by the one or more applications. The ranking information is determined at the remote server using the information gathered from the one or more applications supported by the electronic device. For each of the functionalities in the set, the ranking information represents an estimated relevance to a user. Yet another such operation includes the circuitry of the electronic device generating a modified array of icons using the ranking information for the set of functionalities. Another such operation includes the display of the electronic device presenting the modified array of icons. At least one of the functionalities that is estimated to be relevant to a user is selectable using the modified array of icons via the display.

In embodiments, the ranking information for the set of functionalities includes a value assigned to each of the functionalities. The value corresponding to the expected relevance for each of the functionalities.

In embodiments, the ranking information for the set of functionalities uses text identified from the information gathered from the one or more applications. The text identified corresponds to at least one of the functionalities.

In embodiments, the information gathered from the one or more applications includes advertisement content information and user input received in response to advertisement content.

In embodiments, the memory further stores instructions that, when executed, cause the logic circuitry to narrow the modified array of icons to a given category based on user input.

In embodiments, the given category is determined using commonly used functionalities.

In embodiments, the ranking information is based uses a history of information gathered from the one or more applications.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Embodiments of the present disclosure are directed to systems, methods, and devices, for generating a dynamically adjustable dial pad. In various deployments described herein, an array of icons may be modified, for example, using ranking information for a set of functionalities. The ranking information may represent an estimated relevance for each of the functionalities. The modified array of icons may present functionalities that a user may be interested in employing using the user's electronic device.

The details of some example embodiments of the systems, methods, and devices of the present disclosure are set forth in this description and in some cases, in other portions of the disclosure. Other features, objects, and advantages of the disclosure will be apparent to one of skill in the art upon examination of the present disclosure, description, figures, examples, and claims. It is intended that all such additional systems, methods, devices, features, and advantages be included within this description (whether explicitly or by reference), be within the scope of the present disclosure, and be protected by one or more of the accompanying claims.

Figure 1A:
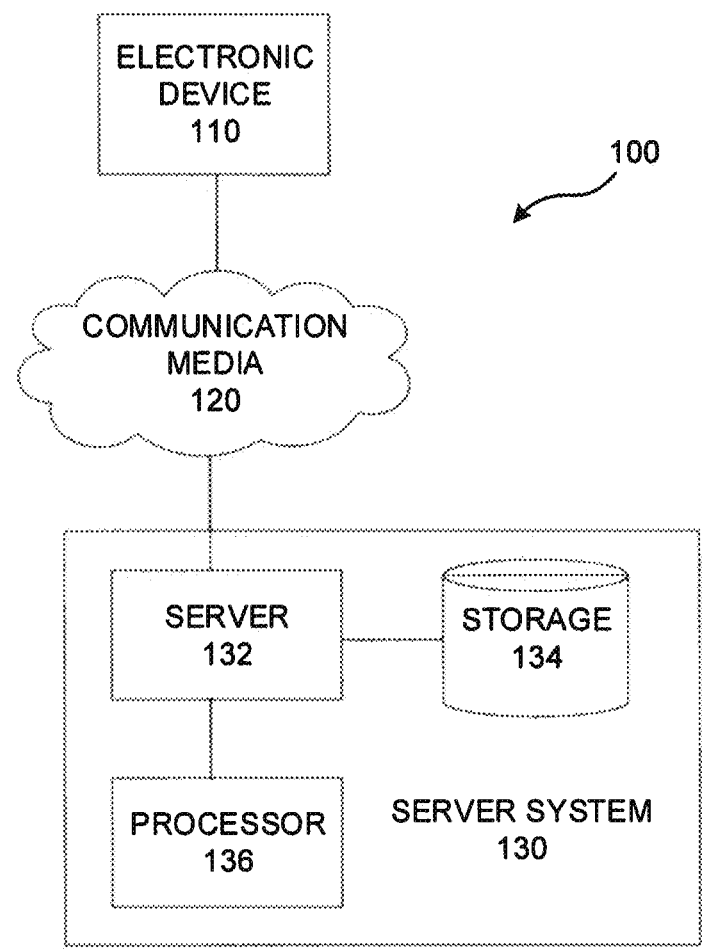
FIG. 1A illustrates an example environment in which embodiments of the disclosure may be implemented.

FIG. 1A depicts example environment 100, which may be used in connection with implementing embodiments of the disclosed systems, methods, and devices. By way of example, the various below-described components of FIG. 1A may be used to generate a dynamically adjustable dial pad, including, e.g., where the dial pad includes a modified array of icons on a display of an electronic device 110. The array of icons may be modified using ranking information for a set of functionalities. Ranking information may represent, for example, an estimated relevance for each of the functionalities.

In embodiments, the ranking information may use any information from one or more applications supported by electronic device 110. Such applications may include, for example, an email application (e.g. Gmail and Hotmail), a web browser (e.g. Chrome and Safari), a shopping application (e.g. Amazon and Nordstrom), a multi-media streaming application (e.g. Netflix and Hulu), a social media application (e.g. Facebook, Twitter, and Instagram), a messaging application (e.g. native text messaging application and Kakao), a video messaging application (e.g. Skype and Hangouts), a phone application (e.g. a native dialing application and Skype), a fitness application (e.g. Google Fit and 5×5), a news applications (e.g. CNN and NBC), a multi-media storage application (e.g. Dropbox and OneDrive), a weather application (e.g. AccuWeather and YoWindow), a calendar application (e.g. Cozi and SmartDay) and/or other applications.

The information gathered from the one or more applications supported by electronic device 110 may include the content of emails, who is included in the email, what time an email was sent, a search history for a web browser, items purchased, items looked at, how long an item was kept on a screen, what multi-media content was streamed, how long the multi-media content was streamed, any content posted onto social media, accounts being followed on social media, events going on, text messages, video calls, phone calls, participants of the texts, video calls, and phone calls, how active a user is, what news is looked at, what type of multi-media content is stored, what the weather is expected to be, what appointments are upcoming, reminders, and/or other information. One of ordinary skill in the art, upon studying the present disclosure, will appreciate that many different types of information may be gathered from any application and/or functionality that may be used in connection with the operation of electronic device 110.

The information from one or more applications supported by electronic device 110 may include an array of icons, location information, time information, audio information, optical information, metadata, IP addresses, personally identifying information, advertisement content, and/or other information.

An array of icons may depict a representation of a functionality. Location information may reflect an electronic device's location, as well as other users nearby. For example, a user may be near a restaurant and the restaurant may be displayed as an icon in the array of icons.

Time information may reflect a real-world time. For example, a user may go to lunch around noon. Around noon, the array of icons may display icons related to restaurants.

Audio information may include information received by a microphone. For example, a user may have gotten a flat tire and mentioned terms out loud related to flat tires, such as flat, tire, inflate, or spare. In response to the user's terms, the array of icons may display icons related to roadside assistance, mechanic shops, or tire companies.

Optical information may include information received by a camera. For example, a camera on an electronic device may capture an image or a video of a department store logo. In response to the captured image or video, the array of icons may display icons related to the department store.

Metadata may reflect information corresponding to the substance of information, such as the name of an owner of electronic device 110. Personally identifying information may include information that may be used to, directly or indirectly, locate an individual or identify an individual in context. Advertisement content may include advertisements, as well as advertisement metadata, such as impressions. Accordingly, environment 100 may enable the generation of a dynamically adjustable dial pad and may improve the function of a dial pad to correspond with a user's preferences or likely action based on factors corresponding to a user. The individual icons may be depicted as a circle, square, triangle, squircle, or any other shape or combination of shapes. The array of icons may be arranged in a line, in a shape, or any other configuration.

As shown in FIG. 1A, environment 100 may include one or more of electronic device 110 and server system 130. Electronic device 110 can be coupled to server system 130 via communication media 120. As will be described in detail herein, electronic device 110 and/or server system 130 may exchange communications signals, including information gathered from one or more applications supported by electronic device 110, an array of icons, ranking information, user preferences, a modified array of icons, functionalities, location information, time information, audio information, optical information, advertisement content, metadata, IP addresses, personally identifying information, and other aspects of content for display on electronic device 110 via communication media 120.

Electronic device 110 may include a variety of electronic computing devices, such as, for example, a smartphone, tablet, laptop, wearable device, and similar devices. Here, a graphical user interface of electronic device 110 may perform such functions as accepting user input and displaying content. The graphical user interface may be provided by various operating systems known in the art, such as, for example, iOS, Android, Windows Mobile, Windows, Mac OS, Chrome OS, Linux, Unix, a gaming platform OS (e.g., Xbox, PlayStation, Wii), and/or other operating systems.

In various embodiments, communication media 120 may be based on one or more wireless communication protocols such as Bluetooth®, ZigBee, 802.11 protocols, Infrared (IR), Radio Frequency (RF), 2G, 3G, 4G, 5G, and/or wired protocols and media. Communication media 120 may be implemented as a single medium in some cases.

As mentioned, electronic device 110 may take a variety of forms, such as a desktop or laptop computer, a smartphone, a tablet, a smartwatch or other wearable electronic device, a television or other audio or visual entertainment device or system, a camera (including still shot or video) or the like. Electronic device 110 may communicate with other devices and/or with one another over communication media 120 with or without the use of server system 130. In various embodiments, electronic device 110 and/or server system 130 may be used to perform various processes described herein and/or may be used to execute various operations described herein with regard to one or more disclosed systems and methods. Upon studying the present disclosure, one of skill in the art will appreciate that environment 100 may include multiple electronic devices 110, communication media 120, server systems 130, servers 132, processors 136, and/or storage 134.

As mentioned, communication media 120 may be used to connect or communicatively couple electronic device 110 and/or server system 130 to one another or to a network, and communication media 120 may be implemented in a variety of forms. For example, communication media 120 may include an Internet connection, such as a local area network (LAN), a wide area network (WAN), a fiber optic network, internet over power lines, a hard-wired connection (e.g., a bus), and the like, or any other kind of network connection. Communication media 120 may be implemented using any combination of routers, cables, modems, switches, fiber optics, wires, radio (e.g., microwave/RF links), and the like. Further, communication media 120 may be implemented using various wireless standards, such as Bluetooth, Wi-Fi, 3GPP standards (e.g., 2G GSM/GPRS/EDGE, 3G UMTS/CDMA2000, 4G LTE/LTE-U/LTE-A, 5G). Upon reading the present disclosure, one of skill in the art will recognize other ways to implement communication media 120 for communications purposes.

Likewise, though not shown, it will be appreciated that a similar communication medium may be used to connect or communicatively couple server 132, processors 136, and/or storage 134 to one another, in addition to other elements of environment 100. In example embodiments, communication media 120 may be, or include, a wired or wireless wide area network (e.g., cellular, fiber, and/or circuit-switched connection) for electronic device 110 and/or server system 130, which may be relatively geographically disparate; and in some cases, aspects of communication media 120 may involve a wired or wireless local area network (e.g., Wi-Fi, Bluetooth, unlicensed wireless connection, USB, HDMI, and/or standard AV), which may be used to communicatively couple aspects of environment 100 that may be relatively close, geographically. In some embodiments, server system 130 may be remote from electronic device 110.

Server system 130 may provide, receive, collect, or monitor information from electronic device 110, such as, for example, information gathered from one or more applications supported by electronic device 110, an array of icons, ranking information, user preferences, a modified array of icons, functionalities, location information, time information, audio information, optical information, advertisement content, metadata, IP addresses, personally identifying information, security and encryption information, and the like. Server system 130 may be configured to receive or send such information via communication media 120. This information may be stored in storage 134 and may be processed using processors 136. In some embodiments, some information may be removed from the information gathered, for example, metadata, envelopes, IP addresses, personally identifying information and/or other information. For example, processors 136 may include an analytics engine capable of performing analytics on information that server system 130 has collected, received, or otherwise interacted with, from electronic device 110. In embodiments, server 132, storage 134, and processors 136 may be implemented as a distributed computing network or as a relational database or the like.

Server 132 may include, for example, an Internet server, a router, a desktop or laptop computer, a smartphone, a tablet, a processor, a component, or the like, and may be implemented in various forms, including, for example, an integrated circuit or collection thereof, a printed circuit board or collection thereof, or in a discrete housing/package/rack or multiple of the same.

In embodiments, server 132 directs communications for electronic device 110 over communication media 120. For example, server 132 may process and exchange messages for electronic device 110 that correspond to information gathered from one or more applications supported by electronic device 110, an array of icons, ranking information, user preferences, a modified array of icons, functionalities, location information, time information, audio information, optical information, advertisement content, metadata, IP addresses, personally identifying information, and/or other information. Server 132 may update information stored on electronic device 110, for example, by delivering applications, ranking information, user preferences, and/or other information thereto. Server 132 may send/receive information to/from electronic device 110 in real time or sporadically. Further, server 132 may implement cloud computing capabilities for electronic device 110.

Figure 1B:
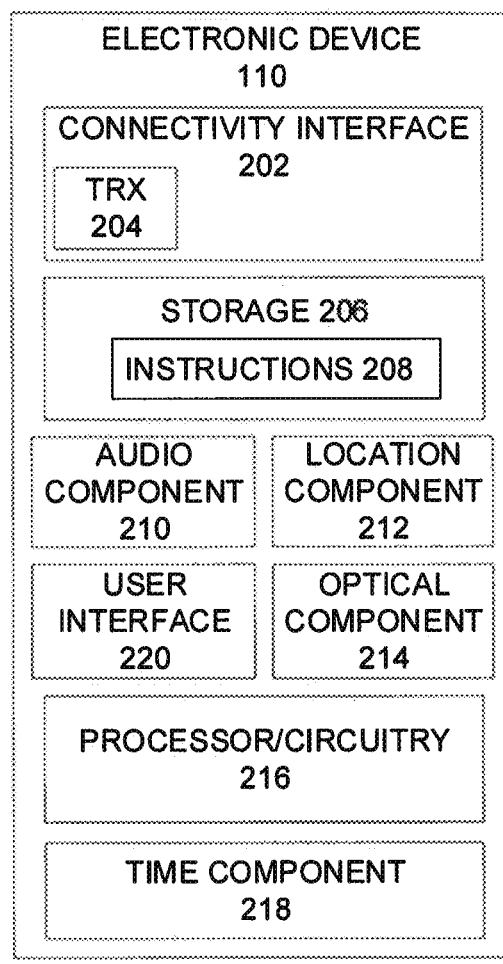
FIG. 1B illustrates an example electronic device according to embodiments of the disclosure.

FIG. 1B depicts example electronic device 110, which includes examples of additional aspects of the present disclosure that may be implemented in connection with example environment 100. As illustrated, electronic device 110 may include connectivity interface 202, which may further include transceiver 204 to communicatively couple electronic device 110 to, for example, server system 130 via communication media 120. In the illustrated embodiment, electronic device 110 further includes storage 206 (which in turn may store instructions 208), audio component 210 (which may be used to provide a microphone or multiple microphones for electronic device 110), location component, 212 (which may be used to provide a locator or multiple locators for electronic device 110), optical component 214 (which may be used to provide a camera or multiple cameras for electronic device 110), processor/circuitry 216, time component 218 (which may be used to provide a time or multiple times for electronic device 110), and user interface 220, which may be used to present an array of icons and other content to a viewer using a display of electronic device 110. A bus (not shown in FIG. 1B) may be used to interconnect the various elements of electronic device 110 and transfer data between these elements.

In FIG. 1B, connectivity interface 202 may interface electronic device 110 to communication media 120, such that electronic device 110 may be communicatively coupled to server system 130 via communication media 120. Transceiver 204 of connectivity interface 202 may include multiple transceiver components (including, for example receiver and transmitter components) operable on different wireless standards and/or other means of communication. Transceiver 204 may be used to send/receive information gathered from the one or more applications to server system 130 and receive ranking information for a set of functionalities or a user preference for a functionality of a set of functionalities. Additionally, connectivity interface 202 may include additional components for controlling radio and/or wired connections, such as baseband and/or Ethernet modems, audio/video codecs, and so on.

In embodiments, transceiver 204 may utilize Bluetooth, ZIGBEE, Wi-Fi, GPS, cellular technology, other wireless communication means, or some combination thereof. Further, although FIG. 1B illustrates a single transceiver 204 for transmitting/receiving information, separate transceivers may be dedicated for communicating particular types of data or for doing so in particular fashions. In some cases, transceiver 204 may include a low energy transmitter/receiver such as a near field communications (NFC) transmitter/receiver and/or a Bluetooth Low Energy (BLE) transmitter/receiver. In further example embodiments, separate wireless transceivers may be provided for receiving/transmitting high fidelity audio and/or video data. In yet additional embodiments, a wired interface (e.g., micro-USB, HDMI, and/or other wired interfaces) may be used for communicating data between electronic device 110 and server system 130.

Storage 206 may include volatile memory (e.g., RAM) and/or non-volatile memory (e.g., flash storage), may include any of EPROM, EEPROM, cache, or may include some combination/variation thereof. In various embodiments, storage 206 may store user input data and/or other data collected by electronic device 110 (e.g., information gathered from one or more applications supported by electronic device 110, functionalities, location information, time information, audio information, optical information, and/or advertisement content, user preferences, ranking information). Storage 206 may also be used to store advertisement content, metadata, information gathered from one or more applications supported by electronic device 110 for later retrieval and use, e.g., in connection with the generation and provision of the array of icons. Additionally, storage 206 may store instructions 208 that, when executed using processor/circuitry 216, for example, can cause electronic device 110 to perform various operations that will be described in further detail herein. It should also be appreciated that storage 206 may be composed of various disaggregated storage elements that may be implemented using various types of storage or memory devices.

In various embodiments, a user may interact with electronic device 110 via user interface 220, which may include a display (not shown) for displaying an array of icons and/or a modified array of icons to a user. By way of example, such a display may be a touchscreen display that accepts various hand gestures as inputs. Instructions 208 may be used for processing and/or presenting an array of icons using electronic device 110, according to various operations described herein.

Instructions 208 may be downloaded, installed, and/or initially configured/setup on electronic device 110. For example, electronic device 110 may obtain instructions 208 from server system 130, or from another source accessed via communication media 120, such as an application store or the like. Following installation and setup, instructions 208 may be used to present an array of icons, gather information from one or more applications supported by electronic device 110, send the information gathered from one or more applications, receive ranking information, and/or modify an array of icons, as will be described herein. Instructions 208 may also be used to interface with other electronic devices, for example, server system 130, to receive therefrom ranking information for a set of functionalities, user preferences for a functionality of a set of functionalities, and/or other content stored at server system 130, as will be described herein.

Instructions 208 may include various code/functional components, such as, for example, information component, array component, option component, ranking component, tag component, encrypting component, extraction component, shortcut component, and/or advertisement component. These components may be implemented separately or in combination. Each component may be implemented using one or more computer-readable media and that may have computer-executable code stored thereon, such that the code may be operatively coupled to and/or executed by processor/circuitry 216 to perform specific functions associated with the components (e.g., as described herein with regard to various operations and flow diagrams). Some such functions according to embodiments of the disclosure relate to generating a modified array of icons and tasks related thereto. Instructions 208 may include a native application modified with a software design kit (e.g., depending on the operating system) in order to carry out the functionalities/features described herein.

The information component may be used to gather information from one or more applications supported by electronic device 110 and/or receive ranking information for a set of functionalities.

The array component may help present an array of icons on a display of electronic device 110. The array component may also help generate a modified array of icons. An icon may be a representation of a functionality. An icon may be a graphic representation of a person, business, and/or entity. The icon may be a logo associated with a brand or business. The icon may be a profile picture of a person.

The option component may provide an option for interacting with one of the icons in the modified array of icons. A first option may be provided for holding an interaction with an icon for a first amount of time. A second option may be provided for holding an interaction with an icon for a second amount of time. A first amount of time may be different from a second amount of time and a first option may be different than a second option. A first option may be provided in response to a first pressure provided on the display. A second option may be provided in response to a second pressure provided on the display. A first pressure may be different from a second pressure and a first option may be different than a second option.

The ranking component may help define ranking information, such that the ranking information includes a numerical value for each of the functionalities of the set. The ranking information for a given functionality of the set may correspond to the estimated relevance of the given functionality.

The tag component may apply a tag to the information gathered by circuitry 216.

The encrypting component may encrypt the information gathered by circuitry 216 before the information is sent to server system 130.

The extraction component may obtain extracted text from an application supported by electronic device 110. The extracted text may be further used in generating the modified array of icons.

Shortcut component may determine that input received via a graphical user interface of the display matches a shortcut stored in server system 130. The shortcut component may further provide an option for interacting with one of the one or more functionalities corresponding to the shortcut that matches the one of the one or more functionalities. A shortcut may be a combination of letters and/or text that is less than an original combination of letters corresponding to a functionality. Another such operation is to provide an option for interacting with one of the one or more functionalities corresponding to the shortcut that matches the one of the one or more functionalities.

The advertisement component may help define the information gathered by circuitry 216 such that the information includes one or more of advertisement content received at electronic device 110 and user input received in response to the advertisement content.

Referring further to FIG. 1B, as mentioned above, electronic device 110 may also include processor/circuitry 216.

Processor/circuitry 216 may include a processor and/or processor components, including, by way of example, an applications processor that interfaces with and/or controls other elements of electronic device 110 (e.g., connectivity interface 202, instructions 208, storage 206, user interface 220, audio component 210, location component 212, optical component 214, and time component 218).

Processor/circuitry 216 may include a controller that provides various controls (e.g., interfaces with buttons and switches) related to the operation of, for example, audio component 210, location component 212, optical component 214, and time component 218, user interface 220, and the like, and interfaces with drivers of various audio/visual/location/time components of electronic device 110. Additionally, the controller may include various controls related to the presenting of an array of icons, gathering of information from one or more applications supported by electronic device 110, sending the information gathered to server system 130, receiving ranking information for a set of functionalities from server system 130, generating a modified array of icons, as well as executing and/or calling the above-described components of instructions 208, such as will be described in further detail herein.

Processor/circuitry 216 may include one or more processors (including, in some instances, logic circuits), memory (ies), battery(ies) and power circuitry, and other circuitry drivers for periphery components, such as audio component 212, location component 212, optical component 214, time component 218, and audio/visual/haptic interfaces that may be included in user interface 220. Processor/circuitry 216 and any processors thereof may include logic circuits for receiving, processing, and/or storing content or information received and/or generated by, and/or data input to, electronic device 110, and content or information to be transmitted or delivered by electronic device 110.

As shown in FIG. 1B, processor/circuitry 216 may be coupled by a bus (not shown) to a display of user interface 220 as well as to connectivity interface 202 and storage 206 (including instructions 208), as well as to audio component 210, location component 212, optical component 214, and time component 218. In this manner, processor/circuitry 216 may receive and process electrical signals generated by these respective elements and thus perform various functions. By way of example, processor/circuitry 216 may access stored content from storage 206 at the direction of instructions 208, and process the stored content for display and/or output by user interface 220. Additionally, processor/circuitry 216 may process the stored content for transmission via connectivity interface 202 and communication media 120 to server system 130.

In further embodiments, logic circuits of processor/circuitry 216 may further detect, calculate, and/or store data received from audio component 210, location component 212, optical component 214, time component 218, one or more applications supported by electronic device 110, system server 130, or another source. The logic circuits may use this input to present/modify aspects of an array of icons being displayed using user interface 220.

Processor/circuitry 216 may be used to drive/control and/or gather information from other peripheral components not shown in detail in FIG. 1B. For example, processor/circuitry 216 may interface with microphones and components of audio component 210 that may be used to capture and/or generate audio information. As another example, processor/circuitry 216 may interface with locators and components of location component 212 that may be used to capture, generate, and/or calculate location information.

Processor/circuitry 216 may interface with camera lenses and components of optical component 214 that may be used to capture, generate, and/or calculate optical information. In example implementations, processor/circuitry 216 may interface with time component 218 that may be used to capture, generate, and/or calculate time information. Processor/circuitry 216 may also interface with video input/output mechanisms such as HDMI, USB, and the like.

In embodiments, server system 130 may store (e.g., using storage 134) information gathered from one or more applications supported by electronic device 110. Some of the information gathered from one or more applications may not be stored, such as personally identifying information, metadata, envelopes, and/or other information.

Server system 130 may also include one or more components that may be similar to those described in connection with as electronic device 110, such as a transceiver 204. However, since aspects of server system 130 may not be limited to the same restraints (e.g., power, space, weight, temperature, etc.), server system 130 may include a more powerful transmitter component, receiver component, and/or transceiver component. Similarly, server system 130 may utilize more processing power, more storage, better connectivity, bigger batteries or alternative power sources that do not require batteries, and/or more accurate components.

Instructions may also be downloaded, installed, and/or initially configured/setup on system server 130. For example, system server 130 may obtain such instructions from a source accessed via communication media 120, such as an application store, program database, or the like. Following installation and setup, instructions may be used to use the receiver of server system 130 to receive, from electronic device 110, information gathered from one or more applications supported by electronic device 110. The instructions may also be executed using processor 136 for example, to remove at least a subset of personally identifying information from the information received from electronic device 110. The instructions may also be also executed using processor 136 for example, to send the information from one or more applications.

Additionally, the instructions may be executed using processor 136 for example, to determine an estimated user preference for a functionality of a set of functionalities using the information received from electronic device 110. Each of the functionalities in the set may correspond to an icon in an array of icons presented on a display of electronic device 110.

Additionally, the instructions may be executed using processor 136 for example, to use the transmitter to send the estimated user preference for the functionality to electronic device 110, as will be described herein. The instructions may also be used to interface with other system servers 130 and/or electronic devices 110.

Instructions may also be provided for server system 130, where such instructions include various code/functional components, such as, for example, a removal component, a decrypting component, a user preference component, a text identifier component, and/or an advertisement component. These components may be implemented separately or in combination. Each component may be implemented using computer-readable media that stores computer-executable code stored and that is operatively coupled to processor/circuitry 216 such that the processor/circuitry 216 can execute the code to perform specific functions (e.g., as described herein with regard to various operations and flow diagrams) with respect to sending an estimated user preference and tasks related thereto. The Instructions may include a native application modified with a software design kit (e.g., depending on the operating system) in order to carry out the functionalities/features described herein.

The removal component may be used to remove a correspondence between metadata and the information received at server system 130 from electronic device 110. The removal component may also be used to remove certain audio information and/or at least a portion of an IP address associated with electronic device 110.

The user preference component may help determine an estimated user preference for a functionality of a set of functionalities. The user preference component may also help assign a numerical value to a given functionality. The numerical value may correspond to the expected relevance of the functionality for a user of electronic device 110.

The decrypting component may decrypt the information received at server system 130 from electronic device 110.

The advertisement component may help identify and/or parse the information received from electronic device 110 such that the information may include one or more of advertisement content received from electronic device 110 and user input received in response to the advertisement content.

Having described some of the various elements of environment 100 and electronic device 110 shown in FIGS. 1A and 1B, an example embodiment using some of these elements for the generation of a modified array of icons will now be provided. In this non-exhaustive example, electronic device 110 may be used to generate a modified array of icons.

Electronic device 110 may use optical component 214 to capture information. Storage 216 may store instructions 208 that when executed by processor/circuitry 216 cause user interface 220 to present an array of icons on a display. Circuitry 216 may gather information from one or more applications supported by electronic device 110. Circuitry 216 may use transceiver 204 to send the information gathered from one or more applications to server system 130. Circuitry 216 may receive, from server system 130, ranking information for a set of functionalities. The ranking information may be determined at server system 130 using the information gathered from the one or more applications supported by electronic device 110. The ranking information may represent an estimated relevance for each of the functionalities. User interface 220 may provide a modified array of icons via a display of electronic device 110. The modified array of icons may be modified using the ranking information, such that the functionalities that are estimated to be relevant to a user are selectable using the modified array of icons. Of course, many variations on this example are possible and within the scope of the present disclosure. This example and aspects thereof may be applied in connection with various embodiments illustrated and/or described in connection with other embodiments described herein.

Another example embodiment using some of these elements for server system 130 will now be provided. In this non-exhaustive example, server system 130 may include a receiver adapted to receive incoming signals, a transmitter adapted to send outgoing signals, circuitry coupled to the transmitter and the receiver, and a non-transitory computer-readable medium.

The non-transitory computer-readable medium may store instructions that when executed by circuitry (e.g., processor 136) within server system 130 cause the receiver to receive, from electronic device 110, information gathered from one or more applications supported by electronic device 110. The circuitry may remove at least a subset of personally identifying information from the information received from electronic device 110. The circuitry may also determine an estimated user preference for a functionality of a set of functionalities using the information received from electronic device 110. Each of the functionalities in the set corresponds to an icon in an array of icons presented on a display of electronic device 110. The circuitry may use the transmitter of server system 130 to send the estimated user preference for the functionality to electronic device 110 via communication media 120. Of course, many variations on this example are possible and within the scope of the present disclosure. This example and aspects thereof may be applied in connection with various embodiments illustrated and/or described in connection with other embodiments described herein.

Figure 2:
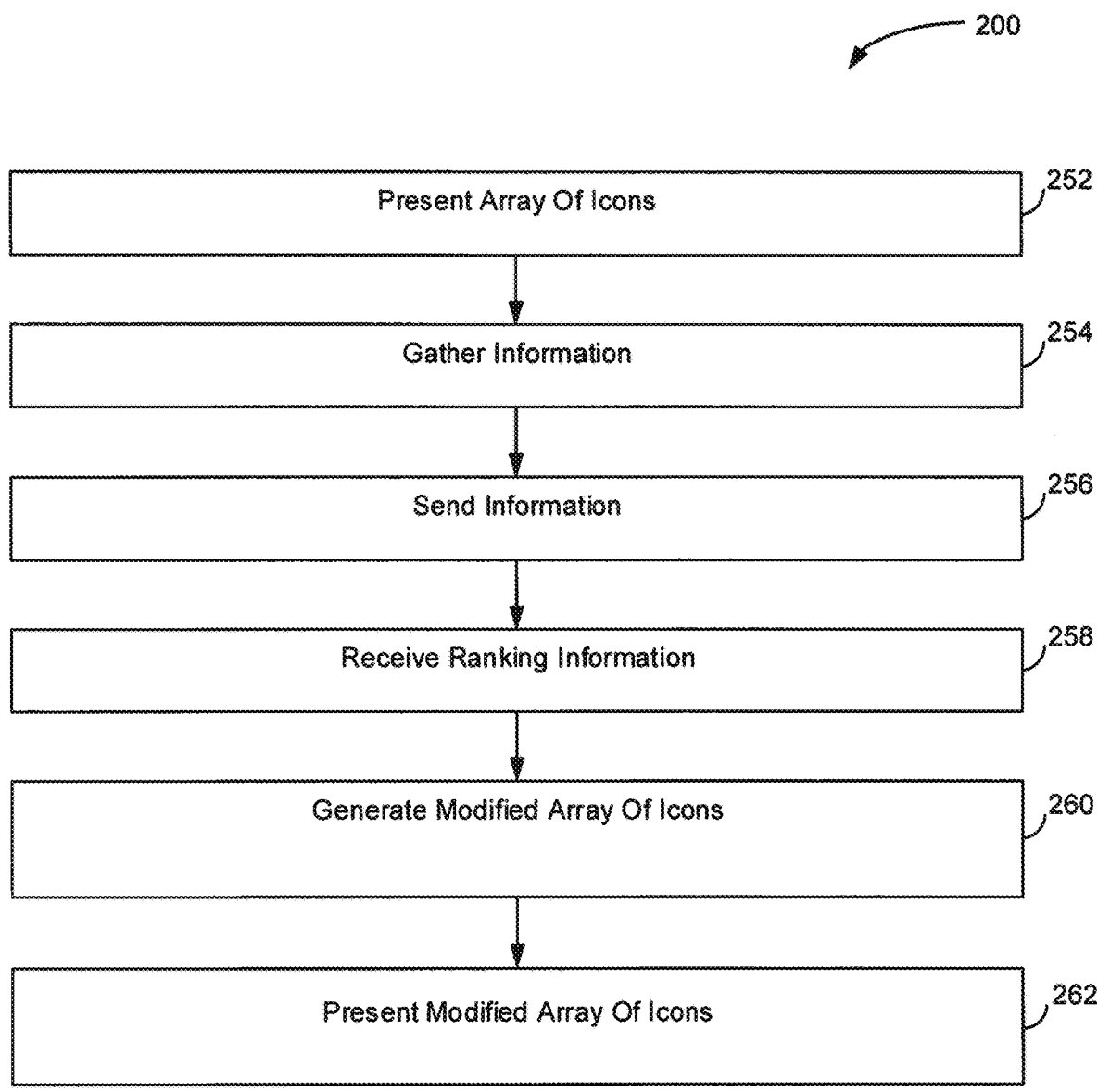
FIG. 2 is an operational flow diagram illustrating various operations that may be performed in accordance with embodiments of the disclosure.

FIG. 2 is an operational flow diagram illustrating various operations that may be performed in accordance with embodiments of the disclosure. At a high level, method 200 may generate a modified array of icons using ranking information. In embodiments, the ranking information is determined at server system 130, and the ranking information represents an estimated relevance for each of the functionalities. The operations of the various methods described herein are not necessarily limited to the order described or shown in the figures, and one of skill in the art will appreciate, upon studying the present disclosure, variations of the order of the operations described herein that are within the spirit and scope of the disclosure.

The operations and sub-operations of method 200 may be carried out, in some cases, by and/or using one or more of the components, elements, devices, sub-components, and circuitry of environments 100, electronic device 110, instructions 208 (including components thereof as describe above), audio component 210, location component 212, optical component 214, time component 218, processor/circuitry 216, connectivity interface 202, server system 130, server 132, processor 136, storage 134 and/or computing component 700 described herein and referenced with respect to at least FIGS. 1A, 1B, and 3-7, as well as components, elements, devices, sub-components, and circuitry depicted therein and/or described with respect thereto.

In such instances, the description of method 200 may or may not refer to a corresponding component and/or element, but regardless of whether an explicit reference is made, one of skill in the art will recognize, upon studying the present disclosure, when the corresponding component and/or element may be used. Further, it will be appreciated that such references do not necessarily limit the described methods to the particular component and/or element referred to. Thus, it will be appreciated by one of skill in the art that aspects and features described above in connection with (sub-) components, elements, devices, components, and/or circuitry, including variations thereof, may be applied to the various operations described in connection with method 200 without departing from the scope of the present disclosure.

Referring now to FIG. 2, aspects of method 200 for generating a modified array of icons are depicted. At operation 252, method 200 optionally includes presenting an array of icons. In embodiments, user interface 220 (referencing FIG. 1B by way of example) may be used to display the array of icons. The array of icons may correspond to a person, business, and/or another entity. The array of icons may also correspond to a set of functionalities.

At operation 254, method 200 includes gathering information. The information may be gathered from one or more applications supported by electronic device 110. The information may include audio information from audio component 210, location information from location component 212, optical information from optical component 214, time information from time component 218, (referencing FIG. 1B by way of example) text extracted from emails, web browsers, messages, and/or other information. In embodiments, the information gathered may be tagged, such that the tag corresponds to one or more of the functionalities.

With further reference to FIG. 2, method 200 optionally includes, at operation 256, sending the information gathered by circuitry 216 of electronic device 110. In embodiments, the information may be encrypted before transceiver 204 sends the information gathered by circuitry 216 (referencing FIG. 1B by way of example).

At operation 258, method 200 includes receiving ranking information at electronic device 110. The ranking information may be determined at server system 130 using the information gathered from the one or more applications supported by electronic device 110 (referencing FIG. 1A by way of example). The ranking information may represent an estimated relevance for each of the functionalities. In embodiments, the ranking information includes a numerical value for each of the functionalities of the set. The ranking information for a given functionality of the set corresponds to the estimated relevance of the given functionality.

At operation 260, method 200 includes generating a modified array of icons. In embodiments, the modified array of icons may be generated using additional/alternative information. For example, the modified array of icons may be generated using location information gathered by electronic device 110 (referencing FIGS. 1A and 1B by way of example). In embodiments, the modified array of icons may be generated using extracted text gathered by electronic device 110 (referencing FIGS. 1A and 1B by way of example). In some cases, the modified array of icons may be generated using time information gathered by electronic device 110 (referencing FIGS. 1A and 1B by way of example). The modified array of icons may be generated using audio information gathered by electronic device 110 (referencing FIGS. 1A and 1B by way of example). In embodiments, the modified array of icons may be generated using optical information gathered by electronic device 110 (referencing FIGS. 1A and 1B by way of example). In certain examples, the modified array of icons may be generated using the advertisement content and related user input gathered by electronic device 110 (referencing FIGS. 1A and 1B by way of example).

At operation 262, method 200 includes causing the display to present the modified array of icons. In embodiments, the modified array of icons uses the ranking information received from server system 130 such that the functionalities that are estimated to be relevant to a user are selectable using the modified array of icons. In embodiments, the functionalities that are estimated to be relevant to a user are selectable using the modified array of icons.

FIGS. 3 through 6 illustrate example arrangements for dial pads in connection with embodiments of the disclosure. These example arrangements demonstrate, by way of example, how an array of icons may be modified according to embodiments of the disclosure.

Figure 3:
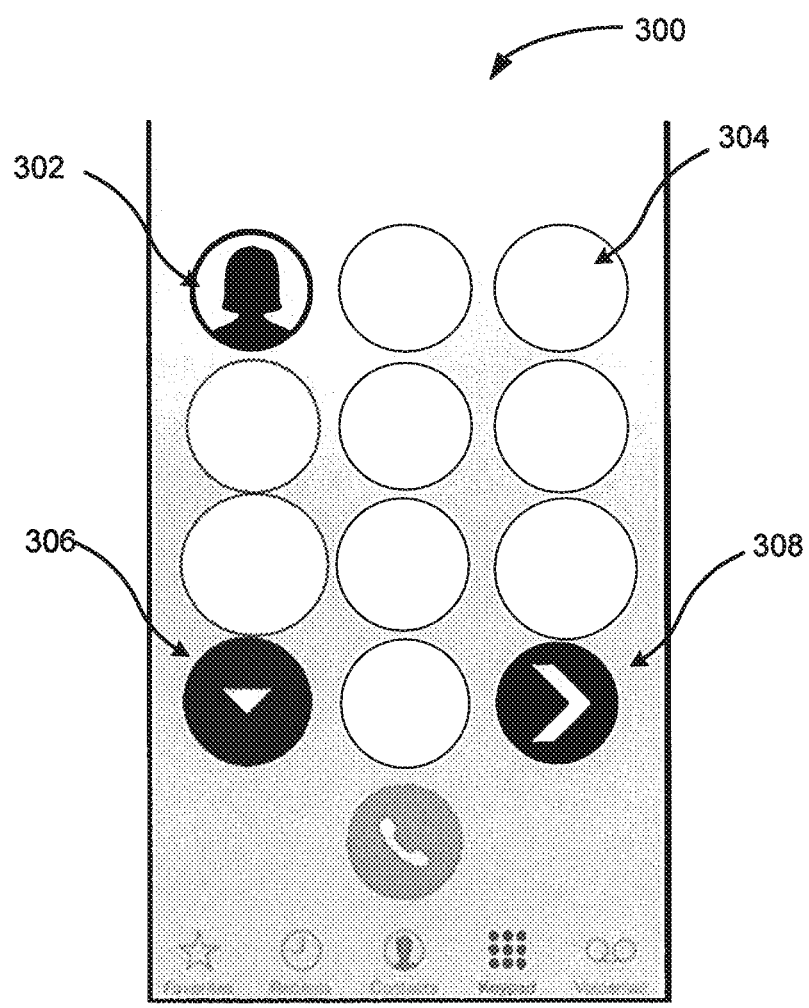
FIG. 3 illustrates an example arrangement in connection with embodiments of the disclosure.

FIG. 3 shows example arrangement 300 that includes icons 302 and 304 and buttons 306 and 308. Icons 302 and 304 may be ordered in terms of the ranking information of the set of functionalities, which are displayed here as white circles by way of example. These circles corresponding to icons 302 and 304 may display a representation of a person, a business/brand logo, application, and/or another representation of an entity or functionality. Icons 302 and 304 may be associated with a person, a business, and/or another entity or functionality.

Button 306 may provide a user with multiple options to interact with electronic device 110. For example, button 306 may provide an option to use a shortcut feature. The shortcut feature may determine if an input received via a graphical user interface of a display of electronic device 110 matches a shortcut stored in server system 130. The shortcut feature may also provide an option for interaction with one of the one or more functionalities corresponding to the shortcut that matches the one of the one or more functionalities. Button 306 may also provide an option to enable or disable one or more applications supported by electronic device 110 that may gather information. Button 306 may also provide an option of sending a message to one or more electronic devices 110. Button 306 may also provide an option to focus the set of functionalities on one or more categories responsive to a user input. For example, a user may input categories such as food, banks, individuals, family members, and/or other inputs to narrow the set of functionalities for selection. Button 308 may allow the user to view another array of icons.

Figure 4A:
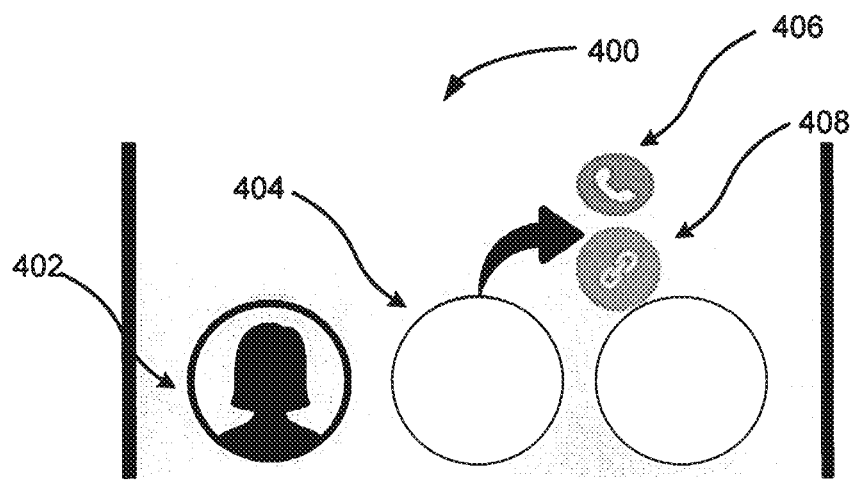
FIG. 4A illustrates an example arrangement in connection with embodiments of the disclosure.

FIG. 4A shows example arrangement 400 that, in response to input received via an icon, provides options for interacting with at least some icons of the modified array of icons. Icon 402 depicts a representation of a person. Icon 404 may depicts a representation of a person, business, application, functionality, and/or another entity. Responsive to user input received using icon 404, icon 404 provides options 406 and 408 for user interaction.

For example, option 406 can provide an option to call a telephone number corresponding to icon 404. Option 408 can provide an option to go to a website or webpage corresponding to icon 408. Other options may be provided, such as finding a location corresponding to an icon that is nearest to electronic device 110, finding one or more locations corresponding to an icon that are within a certain proximity of electronic device 110, finding a physical store or office that is associated with an icon and that is currently open, finding a location associated with an icon that the user has previously interacted with, finding a hotline number corresponding to an icon, ordering an item from an icon, and/or other options.

Figure 4B:
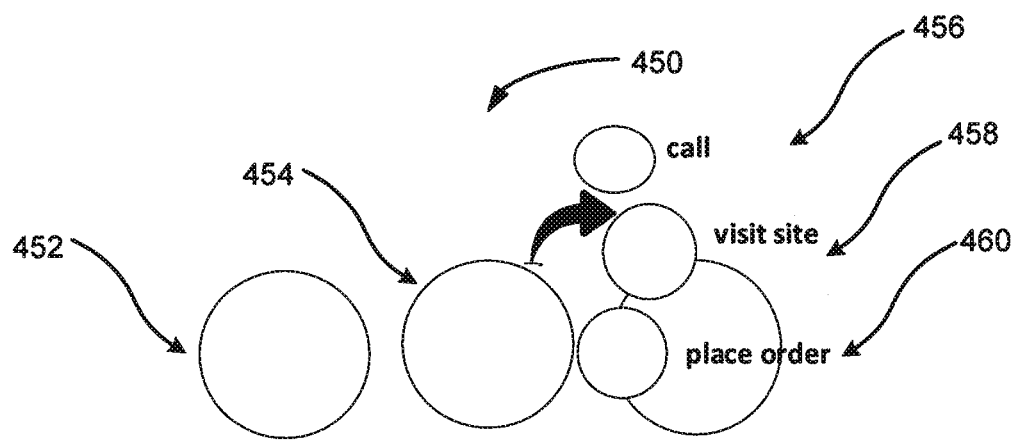
FIG. 4B illustrates an example arrangement in connection with embodiments of the disclosure.

FIG. 4B shows example arrangement 450 that, in response to input received via the icon, provides options for interacting with at least some icons of the modified array of icons. Icon 452 and 454 may represent a person, business, application, functionality, and/or another entity. Responsive to user input received using icon 454, icon 454 may provide options 456, 458, and/or 460 for interaction. For example, option 456 may provide an option to call a number corresponding to icon 404. Option 458 may provide an option to go to a website or webpage corresponding to icon 408. Option 460 may provide an option to place an order from a business or seller associated with icon 408. Other options (not shown in FIG. 4B) may be provided, such as those described above in connection with FIG. 4A.

Figure 5:
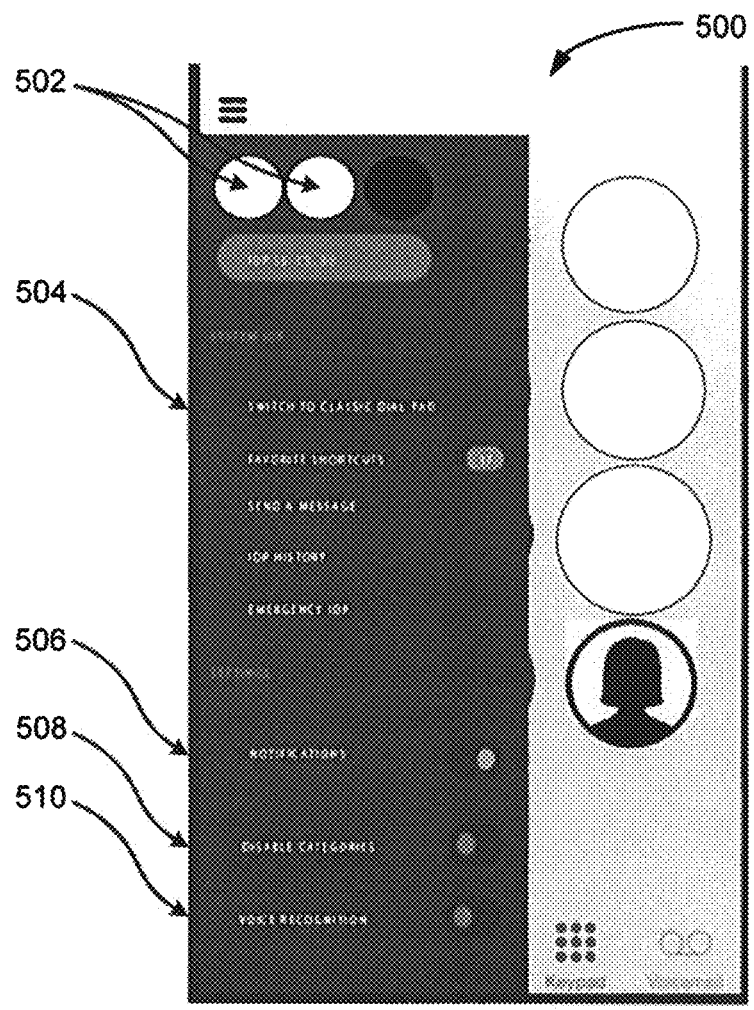
FIG. 5 illustrates an example arrangement in connection with embodiments of the disclosure.

FIG. 5 shows example arrangement 500 that provides options for interacting with one or more functionalities that correspond to a shortcut that matches the one of the one or more functionalities, and for interacting with other features that may be implemented in connection with the dynamically adjustable dial pad of the present disclosure. Icons 502a and 502b may depict a representation of a person, business, brand, application, functionality, and/or another entity.

In embodiments, circuitry 216 of electronic device 110 may have determined that text box 501 (shown, e.g., below icons 502a and 502b) includes inputs "EX, BB," which may match shortcuts stored in server system 130. Icons 502a and 502b may correspond to "EX" and "BB," respectively. After a text box 501 is used for text searching to pull up icons 502a and 052b, in this example, icons 502a and/or 502b may be used to access options available to the user in a similar manner as is described above in connection with FIGS. 4A and 4B.

Features 504 allow a user to activate or perform different functions. For example, features 504 may be used to switch from the dynamic dial pad to a classic dial pad, select favorite shortcuts, send messages, view the history of information gathered by electronic device 110, and/or quickly select an emergency feature. Favorite shortcuts may be selected by a user and/or determined using a user's preferences. The history of the information may be deleted and/or modified, which may affect ranking information and/or user preferences. The emergency feature may bring up emergency numbers and/or functionalities or applications, as well as family members' numbers or social media profiles to quickly notify others of a user's state of safety. The emergency feature may also identify a car stopped in the middle of a highway as having broken down and suggest road side assistance, tow truck companies, and other emergency services.

Other features may not be shown, but may be included. For example, a feature may detect advertisements and provide an icon corresponding to a functionality corresponding to the advertisement. Another feature may allow a user to select favorite locations corresponding to an icon. A feature may allow a user to select favorite categories. Another feature may allow a user to select icons that are used most often. In another example, the number of icons within an array of icons may be adjusted. The colors displayed to the user may also be adjusted. The number of options provided, responsive to user input, may be adjusted.

Toggles 506, 508, and 510 can allow a user to be notified if an array of icons has been modified, disable categories, and/or toggle voice recognition, respectively. For example, a user may choose to turn off certain notifications so that the user will see a modified array of icons if the user opens or activates the dynamically adjustable dial pad. If toggle 506 is on, a user may be notified any time the array of icons is modified. The user may also be notified in certain situations or if certain conditions are met. If toggle 508 is off, for example, all information that can be gathered by electronic device 110 may be gathered. If toggle 508 is on, some information may not be gathered. If toggle 510 is off, for example, the dynamically adjustable dial pad may not recognize the user's voice, and/or electronic device 110 may not be able to gather audio information. If toggle 510 is on, the dynamically adjustable dial pad may be able to recognize the user's voice, and/or may be able to gather audio information.

Figure 6:
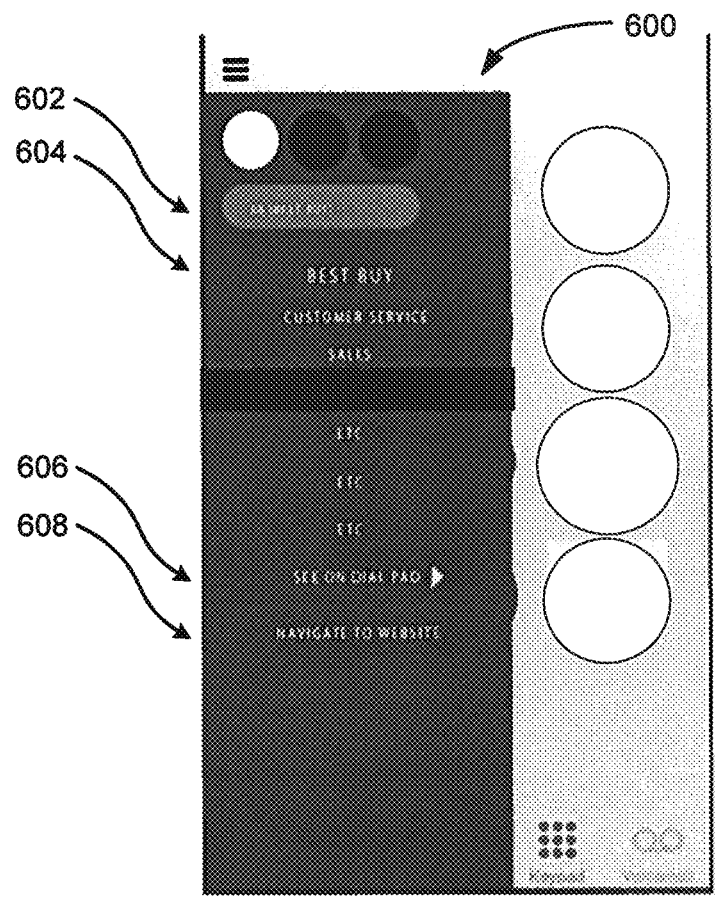
FIG. 6 illustrates an example arrangement in connection with embodiments of the disclosure.

FIG. 6 shows example arrangement 600, which provides options for interacting with one or more functionalities that correspond to a shortcut that matches the one or more functionalities and for interacting with other features of the dynamically adjustable dial pad. Circuitry 216 may have determined that text box 602 includes input "BB," which may match a shortcut corresponding to, for example, one or more functionalities associated with Best Buy. The icon corresponding to the shortcut may be a white circle above text box 602. Option 604 may provide options for interacting with the functionality(ies) associated with Best Buy. For example, selecting "Customer Service" may correspond to a hotline number for Best Buy's customer service department. Selecting the "Customer Service" option may correspond to a website for Best Buy's customer service department. In another example, selecting "Sales" may correspond to a hotline number for Best Buy's sales department, or may correspond to a website for Best Buy's sales department. Feature 606 may modify the array of icons such that a representation of Best Buy is presented as an icon. Feature 606 may also present a shortcut and/or full number. Feature 608 may provide an option for interacting with a website or webpage corresponding to Best Buy.

Figure 7:
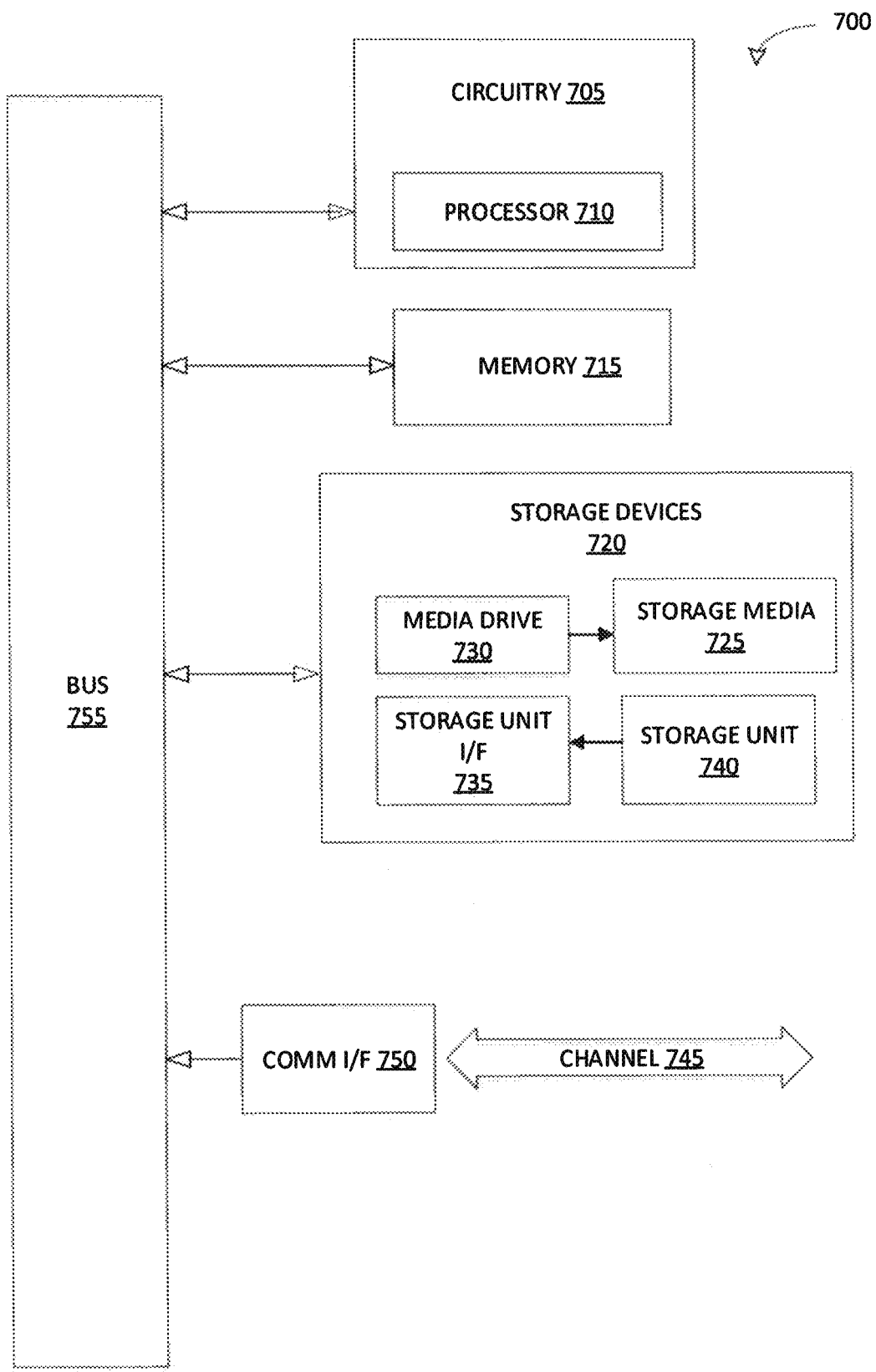
FIG. 7 illustrates an example computing component that may be used to implement features of various embodiments of the disclosure.

FIG. 7 illustrates example computing component 700, which may in some instances include a processor/controller resident on a computer system (e.g., server system 130 and/or electronic device 110). Computing component 700 may be used to implement various features and/or functionality of embodiments of the systems, devices, and methods disclosed herein. With regard to the above-described embodiments set forth herein in the context of systems, devices, and methods described with reference to FIGS. 1A through 6, including embodiments involving electronic device 110 and/or server system 130, one of skill in the art will appreciate additional variations and details regarding the functionality of these embodiments that may be carried out by computing component 700. In this connection, it will also be appreciated by one of skill in the art upon studying the present disclosure that features and aspects of the various embodiments (e.g., systems) described herein may be implemented with respected to other embodiments (e.g., methods) described herein without departing from the spirit of the disclosure.

As used herein, the term component may describe a given unit of functionality that may be performed in accordance with one or more embodiments of the present application. As used herein, a component reference a module, and/or may be implemented utilizing any form of hardware, software, or a combination thereof. For example, one or more processors, controllers, ASICs, PLAs, PALs, CPLDs, FPGAs, logical components, software routines or other mechanisms may be implemented to make up a component. In embodiment, the various components described herein may be implemented as discrete components or the functions and features described may be shared in part or in total among one or more components. In other words, as would be apparent to one of ordinary skill in the art after reading this description, the various features and functionality described herein may be implemented in any given application and may be implemented in one or more separate or shared components in various combinations and permutations. Even though various features or elements of functionality may be individually described or claimed as separate components, one of ordinary skill in the art will understand upon studying the present disclosure that these features and functionality may be shared among one or more common software and hardware elements, and such description shall not require or imply that separate hardware or software components are used to implement such features or functionality.

Where components of the application are implemented in whole or in part using software, in embodiments, these software elements may be implemented to operate with a computing or processing component capable of carrying out the functionality described with respect thereto. One such example computing component is shown in FIG. 7. Various embodiments are described in terms of example computing component 700. After reading this description, it will become apparent to a person skilled in the relevant art how to implement example configurations described herein using other computing components or architectures.

Referring now to FIG. 7, computing component 700 may represent, for example, computing or processing capabilities found within mainframes, supercomputers, workstations or servers; desktop, laptop, notebook, or tablet computers; hand-held computing devices (tablets, PDA's, smartphones, cell phones, palmtops, and/or other computing devices.); or the like, depending on the application and/or environment for which computing component 700 is specifically purposed.

Computing component 700 may include, for example, one or more processors, controllers, control components, or other processing devices, such as a processor 710, and such as may be included in circuitry 705. Processor 710 may be implemented using a special-purpose processing engine such as, for example, a microprocessor, controller, or other control logic. In the illustrated example, processor 710 is connected to bus 755 by way of circuitry 705, although any communication medium may be used to facilitate interaction with other components of computing component 700 or to communicate externally.

Computing component 700 may also include one or more memory components, simply referred to herein as main memory 715. For example, random access memory (RAM) or other dynamic memory may be used for storing information and instructions to be executed by processor 710 or circuitry 705. Main memory 715 may also be used for storing temporary variables or other intermediate information during execution of instructions to be executed by processor 710 or circuitry 705. Computing component 700 may likewise include a read only memory (ROM) or other static storage device coupled to bus 755 for storing static information and instructions for processor 710 or circuitry 705.

Computing component 700 may also include one or more various forms of information storage devices 720, which may include, for example, media drive 630 and storage unit interface 735. Media drive 730 may include a drive or other mechanism to support fixed or removable storage media 725. For example, a hard disk drive, a floppy disk drive, a magnetic tape drive, an optical disk drive, a CD or DVD drive (R or RW), or other removable or fixed media drive may be provided. Accordingly, removable storage media 725 may include, for example, a hard disk, a floppy disk, magnetic tape, cartridge, optical disk, a CD or DVD, or other fixed or removable medium that is read by, written to or accessed by media drive 730. As these examples illustrate, removable storage media 725 may include a computer usable storage medium having stored therein computer software or data.

In alternative embodiments, information storage devices 720 may include other similar instrumentalities for allowing computer programs or other instructions or data to be loaded into computing component 700. Such instrumentalities may include, for example, fixed or removable storage unit 740 and storage unit interface 735. Examples of such removable storage units 740 and storage unit interfaces 735 may include a program cartridge and cartridge interface, a removable memory (for example, a flash memory or other removable memory component) and memory slot, a PCMCIA slot and card, and other fixed or removable storage units 740 and storage unit interfaces 735 that allow software and data to be transferred from removable storage unit 740 to computing component 700.

Computing component 700 may also include a communications interface 750. Communications interface 750 may be used to allow software and data to be transferred between computing component 700 and external devices. Examples of communications interface 750 include a modem or soft-modem, a network interface (such as an Ethernet, network interface card, WiMedia, IEEE 802.XX, or other interface), a communications port (such as for example, a USB port, IR port, RS232 port Bluetooth® interface, or other port), or other communications interface. Software and data transferred via communications interface 750 may typically be carried on signals, which may be electronic, electromagnetic (which includes optical) or other signals capable of being exchanged by a given communications interface 750. These signals may be provided to/from communications interface 750 via channel 745. Channel 745 may carry signals and may be implemented using a wired or wireless communication medium. Some non-limiting examples of channel 745 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 715, storage unit interface 735, removable storage media 725, and channel 745. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing component 700 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and embodiments, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a," "an," or "one" should be read as meaning "at least one," "one or more" or the like; unless otherwise expressly limited, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the sub-components or functionality described or claimed as part of the component are all configured in a common package. Indeed, any or all of the various sub-components of a component, whether control logic or other sub-components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A server system, comprising:
   a receiver adapted to receive incoming signals;
   a transmitter adapted to send outgoing signals;
   circuitry coupled to the transmitter and the receiver; and
   a non-transitory computer-readable medium operatively coupled to the circuitry and storing instructions that, when executed, cause the circuitry to:
      use the receiver to obtain information gathered from one or more applications supported by an electronic device;
      remove a subset of personally identifying information from the information obtained from the electronic device;
      determine an estimated user preference for a functionality of a set of functionalities presented as a plurality of selectable icons in an array of icons on a dial pad on a display of the electronic device using the information obtained from the electronic device, wherein each selectable icon represents an entity corresponding to the functionality and wherein the entity comprises one of a person and a business; and
      use the transmitter to communicate the estimated user preference for the functionality to the electronic device;
      wherein the applications supported by the electronic device comprise at least one of an email application, a web browser, an ecommerce application, a social media application, and a messaging application;
      wherein the information gathered from the email application comprises email information specifying at least one of a content of an email, recipients of the email, and a time the email was sent;
      wherein the information gathered from the web browser application comprises web browser information specifying a search history from the web browser application;
      wherein the information gathered from the ecommerce application comprises ecommerce information specifying at least one of items purchased on the ecommerce application, the items looked at on the ecommerce application, and a duration an item was viewed on the ecommerce application;
      wherein the information gathered from the social media application comprises social media information specifying content posted using the social media application, and accounts being followed on the social media application;
   wherein the information gathered from the messaging application comprises message information specifying at least one a content of a message, a recipient of the message, and a time the message was sent; and
   wherein in response to input received via one of the plurality of selectable icons display a plurality of options for interaction based on the information gathered from at least one of an email application, a web browser, an ecommerce application, a social media application and a messaging application.

2. The system of claim 1, wherein the non-transitory computer-readable medium further stores instructions that, when executed, cause the circuitry to remove a correspondence between metadata and the information obtained from the electronic device.

3. The system of claim 1, wherein the information obtained from the electronic device has been encrypted, and wherein the non-transitory computer-readable medium further stores instructions that, when executed, cause the circuitry to decrypt the information obtained from the electronic device.

4. The system of claim 1, wherein the information obtained from the electronic device comprises audio information and an IP address for the electronic device, and wherein the non-transitory computer-readable medium further stores instructions that, when executed, cause the circuitry to remove the subset of personally identifying information by removing the audio information and the IP address for the electronic device.

5. The system of claim 1, wherein the non-transitory computer-readable medium further stores instructions that, when executed, cause the circuitry to determine the estimated user preference for the functionality of the set of functionalities using a value assigned to the functionality, wherein the value corresponds to an expected relevance of the functionality for a user of the electronic device.

6. The system of claim 1, wherein the non-transitory computer-readable medium further stores instructions that, when executed, cause the circuitry to determine the estimated user preference for the functionality of the set of functionalities using text identified from the information obtained from the electronic device, wherein the text identified by the circuitry corresponds to the functionality.

7. The system of claim 1, wherein the information obtained from the electronic device comprises advertisement content information and user input received in response to advertisement content.

8. A computer implemented method to estimate relevant functionalities, the method comprising:
   a receiver of a server receiving information gathered from one or more applications supported by an electron device;

a processor of the server removing a subset of personally identifying information from the information received from the electronic device;

the processor of the server determining an estimated user preference for a functionality of a set of functionalities presented as a plurality of selectable icons in an array of icons on a dial pad on a display of the electronic device using the information received from the electronic device, wherein each selectable represents an entity corresponding to the functionality and wherein the entity comprises one of a person and a business; and a transmitter of the server sending the estimated user preference for the functionality to the electronic device;

wherein the applications supported by the electronic device comprise at least one of an email application, a web browser, an ecommerce application, a social media application, and a messaging application;

wherein the information gathered from the email application comprises email information specifying at least one of a content of an email, a recipient of the email, and a time the email was sent;

wherein the information gathered from the web browser application comprises web browser information specifying a search history from the web browser application;

wherein the information gathered from the ecommerce application comprises ecommerce information specifying at least one of items purchased on the ecommerce application, the items looked at on the ecommerce application, and a duration an item was viewed on the ecommerce application;

wherein the information gathered from the social media application comprises social media information specifying content posted using the social media application, and accounts being followed on the social media application;

wherein the information gathered from the messaging application comprises message information specifying at least one a content of a message, a recipient of the message, and a time the message was sent; and wherein in response to input received via one of the plurality of selectable icons display a plurality of options for interaction based on the information gathered from at least one of an email application, a web browser, an ecommerce application, a social media application and a messaging application.

9. The method of claim 8, further comprising the processor of the server removing a correspondence between metadata and the information received from the electronic device.

10. The method of claim 8, further comprising decrypting the information received from the electronic device, wherein the information received from the electronic device has been encrypted at the electronic device.

11. The method of claim 8, wherein the information received from the electronic device comprises audio information and an IP address for the electronic device, and wherein the processor removing the subset of personally identifying information comprises removing the audio information and the IP address for the electronic device.

12. The method of claim 8, wherein the processor determining the estimated user preference for the functionality of the set of functionalities comprises assigning a value to the functionality, the value corresponds to an expected relevance of the functionality for a user of the electronic device.

13. The method of claim 8, wherein the processor determining the estimated user preference for the functionality of the set of functionalities comprises identifying text from the information received from the electronic device, wherein the text identified by the processor corresponds to the functionality.

14. The method of claim 8, wherein the information received from the electronic device comprises advertisement content information and user input received in response to advertisement content.

15. A server system coupled to one or more electronic devices, the server system. comprising:

a non-transitory computer-readable medium operatively coupled to logic circuitry and storing instructions that, when executed, cause the logic circuitry to:

obtain information gathered from one or more applications supported by one of the electronic devices;

remove a subset of personally identifying information from the information gathered from the one or more applications;

determine an estimated user preference for a functionality of a set of functionalities presented as a plurality of selectable icons in an array of icons on a dial pad on a display of the electronic device using the information gathered from the one or more applications, wherein each selectable icon represents an entity corresponding to the functionality and wherein the entity comprises one of a person and a business; and cause the estimated user preference for the functionality to be communicated to the one electronic device:

wherein the applications supported by the electronic device comprise at least one of an email application, a web browser, an ecommerce application, a social media application, and a messaging application;

wherein the information gathered from the email application comprises email information specifying at least one of a content of an email, a recipient of the email, and a time the email was sent;

wherein the information gathered from the web browser application comprises web browser information specifying a search history from the web browser application;

wherein the information gathered from the ecommerce application comprises ecommerce information specifying at least one of items purchased on the ecommerce application, the items looked at on the ecommerce application, and a duration an item was viewed on the ecommerce application;

wherein the information gathered from the social media application comprises social media information specifying content posted using the social media application, and accounts being followed on the social media application;

wherein the information gathered from the messaging application comprises message information specifying at least one a content of a message, a recipient of the message, and a time the message was sent; and wherein in response to input received via one of the plurality of selectable icons display a plurality of options for interaction based on the information gathered from at least one of an email application, a web browser, an ecommerce application, a social media application and a messaging application.

16. The system of claim 15, wherein the information obtained from the electronic device comprises time information obtained using a time component of the electronic device, and wherein the non-transitory computer-readable medium further stores instructions that, when executed, cause the logic circuitry to determine the estimated user preference for the functionality of the set of functionalities using the time information.

17. The system of claim 15, wherein the information obtained from the electronic device comprises audio information obtained using an audio component of the electronic device, and wherein the non-transitory computer-readable medium further stores instructions that, when executed, cause the logic circuitry to determine the estimated user preference for the functionality of the set of functionalities using the audio information.

18. The system of claim 15, wherein the information obtained from the electronic device comprises optical information obtained using an optical component of the electronic device, and wherein the non-transitory computer-readable medium further stores instructions that, when executed, cause the logic circuitry to determine the estimated user preference for the functionality of the set of functionalities using the optical information.

19. The system of claim 15, wherein the information obtained from the electronic device comprises a tag, wherein the tag corresponds to the functionality, and wherein the non-transitory computer-readable medium further stores instructions that, when executed, cause the logic circuitry to determine the estimated user preference for the functionality of the set of functionalities using the tag.

20. The system of claim 15, wherein the non-transitory computer-readable medium further stores instructions that, when executed, cause the logic circuitry to identify text from the information gathered from the one or more applications, wherein the text identified by the logic circuitry corresponds to the functionality.

* * * * *